United States Patent [19]

Kojima et al.

[11] Patent Number: 5,280,476
[45] Date of Patent: Jan. 18, 1994

[54] COMMUNICATION CONTROL SYSTEM USING AN ASYNCHRONOUS TRANSFER MODE NETWORK

[75] Inventors: Mutsumi Kojima, Hino; Toshio Masaki, Machida, both of Japan

[73] Assignee: Kabushiki Kaisha Toshiba, Kawasaki, Japan

[21] Appl. No.: 765,970

[22] Filed: Sep. 26, 1991

[30] Foreign Application Priority Data

Sep. 28, 1990 [JP]  Japan .................................. 2-261700

[51] Int. Cl.⁵ ...................... H04L 12/48; H04L 12/56
[52] U.S. Cl. ................................................. 370/60.1
[58] Field of Search ..................... 370/60, 60.1, 94.1, 370/94.2, 58.1, 58.2, 58.3, 110.1, 85.1, 85.13, 85.14

[56] References Cited

U.S. PATENT DOCUMENTS

| | | | |
|---|---|---|---|
| 4,787,082 | 11/1988 | Delaney et al. | 370/85.1 |
| 4,926,420 | 5/1990 | Shimizu | 370/94.1 |
| 4,930,123 | 5/1990 | Shimizu | 370/110.1 |

OTHER PUBLICATIONS

Proceedings of the International Switching Symposium, Stockholm, May 28th—Jun. 1st, 1990, vol. 6, pp. 5–10 K. Yamazaki et al.: "Connectionless cell switching schemes for broadband ISDN".

Proceedings of the IEEE INFOCOM'90, San Francisco, Calif., Jun. 5th–7th 1990, vol. 2, pp. 796–802; S. Iisaku et al.: "ATM network architecture for supporting the connectionless service".

IEEE International Conference on Communications, Atlanta, Ga., Apr. 15th–19th, 1990, vol. 3, pp. 826–830; G. Fioretto et al.: "ATM based network transport service".

Proceedings of the International Switching Symposium, Stockholm, May 28th –Jun. 1, 1990, vol. 4, pp. 29–33; E. Matthias et al.: "Strategy for an ATM interconnect network".

*Primary Examiner*—Wellington Chin
*Attorney, Agent, or Firm*—Oblon, Spivak, McClelland, Maier & Neustadt

[57] ABSTRACT

A communication control system using an ATM network and constructed by a small number of virtual connections. Fixed or semi-fixed virtual connection connect each user interface and a corresponding connectionless service processor and interconnect the connectionless service processors. A data packet received from a user terminal is converted into an ATM cell by the user interface and delivered to the connectionless service processor through the virtual connection. In the connectionless service processor, an ATM cell is transferred into a virtual connection located in the direction in which the destination user interface is provided to thereby carry out routine to the ATM cell.

5 Claims, 13 Drawing Sheets

COMMUNICATION CONTROL SYSTEM USING AN ASYNCHRONOUS TRANSFER MODE NETWORK

BACKGROUND OF THE INVENTION

1. Field of the Invention

The present invention relates to communication control systems using an Asynchronous Transfer Mode (ATM) Network and more particularly to a communication control system using an ATM network, which is constructed by a small number of virtual connections.

2. Description of the Related Art

FIG. 13 shows a conventional communication control system using an ATM network. The ATM network system of FIG. 13 includes six user interfaces IMF-1–IMF6 which are connected to the corresponding groups of user units E11–E1m, E21–E2n, E31–E3o, E41–E4p, E51–E5q, and E61–E6r. The user interfaces IF1–IF6 are connected to an ATM network 10, which have many fixed or semi-fixed virtual connections 11 which interconnect user interfaces IF1–IF6 in a mesh-like manner.

In such an arrangement, user interfaces IF1–IF6 convert data packets outputted by user units E11–E1m, E21–E2n, E31–E3o, E41–E4p, E51–E5q, and E61–E6r to ATM cells and deliver the converted ATM cells to virtual connections 11 connected to a destination user interface.

However, this conventional system requires the virtual connections whose number is given by $$N \times (N-1)/2$$

where N is the number of user interfaces. Thus, as the scale of the system becomes large, a great number of virtual connections is required. Such system is not practical.

SUMMARY OF THE INVENTION

It is an object of the present invention to provide a communication control system using an ATM network which eliminates the above-described problem in the conventional system so as to be constructed by a small number of virtual connections.

In order to achieve the above object, the present invention provides a communication control system using an asynchronous transfer mode network constructed by a plurality of asynchronous transfer mode exchanges and asynchronous transfer mode transmission paths, which comprises a plurality of connectionless service processors connected to the asynchronous transfer mode exchanges; a plurality of user interfaces for connecting the asynchronous transfer mode network and user terminals; fixed or semi-fixed virtual connectors for connecting the user interfaces and the connectionless service processors and for interconnecting the connectionless service processors; a sending device provided in the user interfaces for converting a data packet outputted from the user terminals to an asynchronous transfer mode cell and delivering the cell through the virtual connectors to the connectionless processors; a routing device provided in connectionless processors for transferring the asynchronous transfer mode cell to the virtual connectors in the direction in which destination user interface is provided so as to carry out routing to the asynchronous transfer mode cell.

According to the present invention, a user interface and a connectionless service processor are connected by a fixed or semi-fixed virtual connection and connectionless service processors are interconnected by a virtual connection. A data packet outputted by a user terminal is converted by the corresponding user interface into an ATM cell, and then delivered by the virtual connection to the corresponding connectionless processor. The ATM cell is then transferred to a virtual connection for the destination user interface so as to carry out routing of the ATM cell. With the above described construction, the present invention provides a communication control system using an ATM network capable of constructing the system using a small number of virtual connections.

BRIEF DESCRIPTIONS OF THE DRAWINGS

Figure 13:
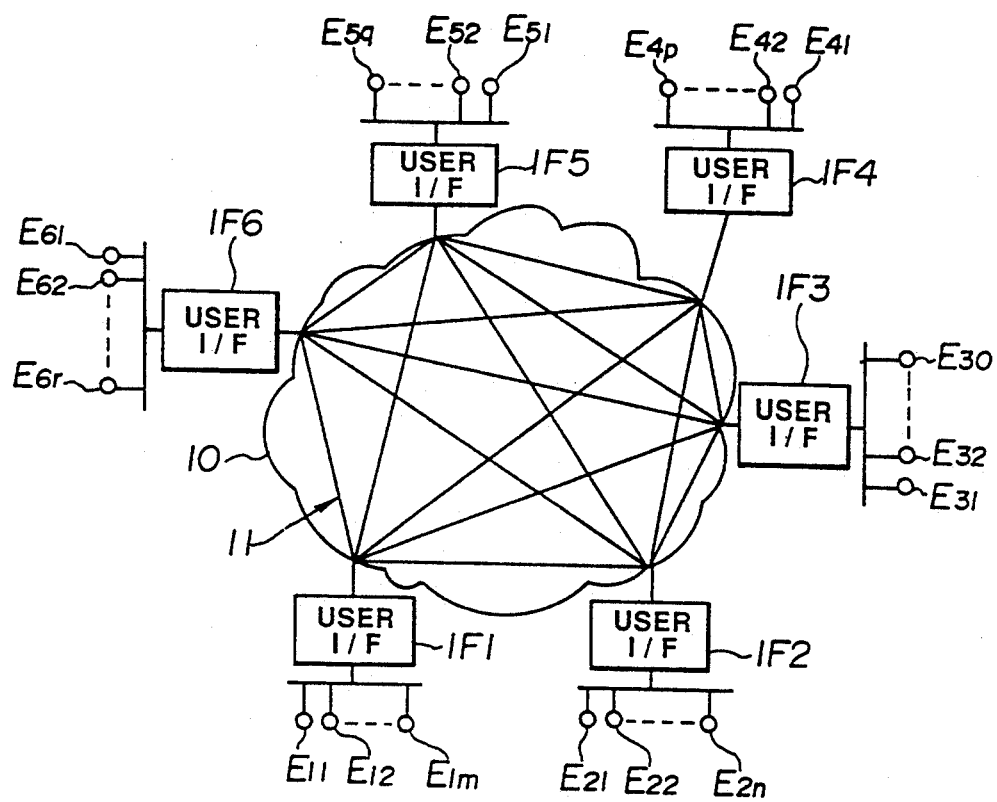

FIG. 13 schematically illustrates the structure of a conventional communication control system using an asynchronous transfer mode network.

DESCRIPTION OF THE PREFERRED EMBODIMENTS

Figure 1:
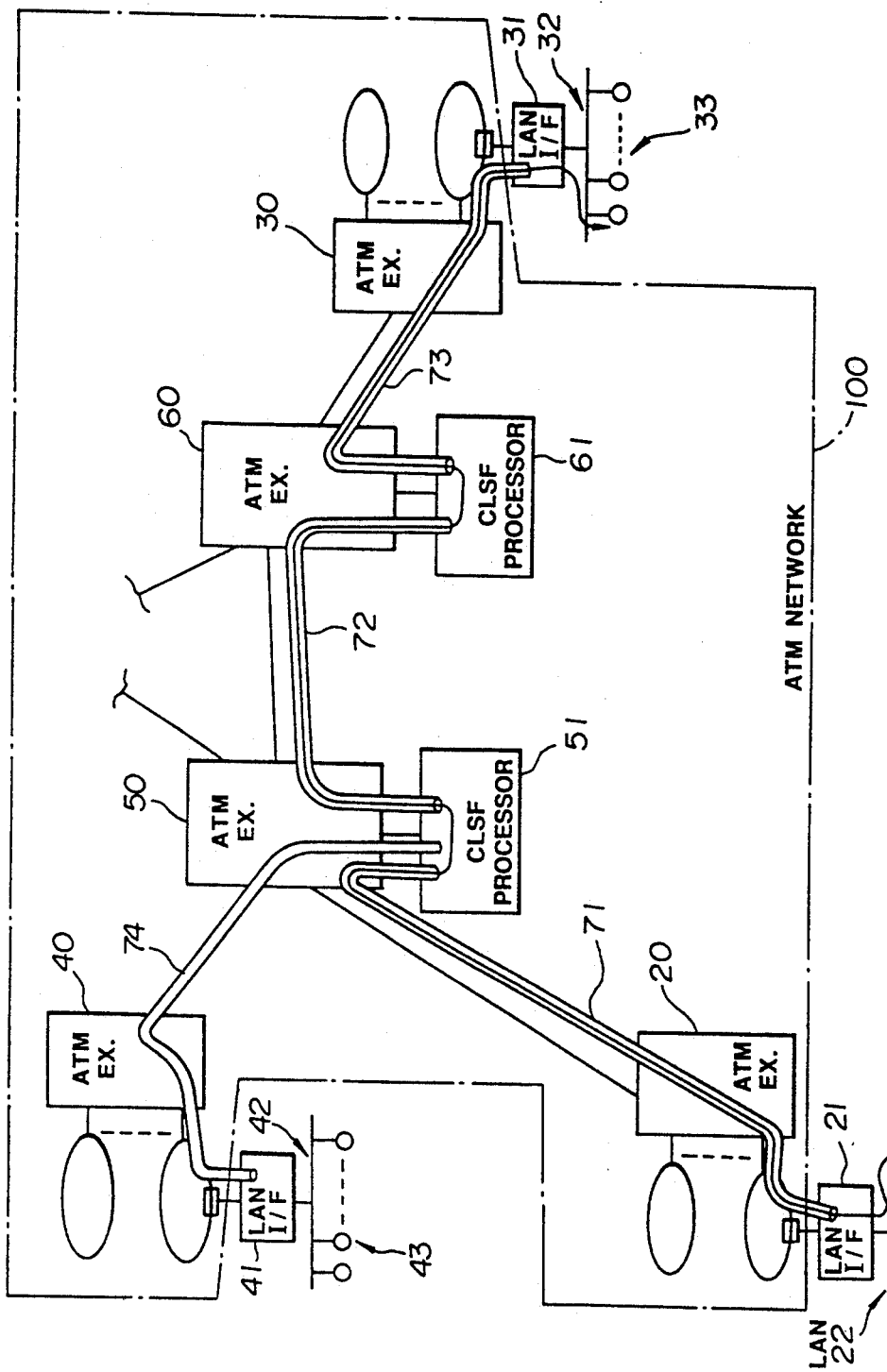
FIG. 1 shows a system structure of one embodiment of a communication control system using an asynchronous transfer mode network according to the present invention.

FIG. 1 illustrates a system structure of a communication control system using an ATM network according to one embodiment of the present invention. In FIG. 1, the communication control system comprises three distributed ATM exchanges 20, 30 and 40 and two centralized ATM exchanges 50 and 60. Distributed ATM exchange 20 is connected through user interface (LAN I/F) 21 and local area network (LAN) 22 to a plurality of user terminals 23. Distributed ATM exchange 30 is connected through user interface (LAN I/F) 31 and local area network (LAN) 32 to a plurality of user terminals 33. Distributed ATM exchange 40 is connected through user interface (LAN I/F) 41 and a local area network (LAN) 42 to a plurality of user terminals 43. In this embodiment, LANs 22, 32 and 42 are constructed by using 802 type LAN recommended by IEEE, 802. Although not shown in FIG. 1, distributed ATM exchanges 20, 30 and 40 are each connected through a plurality of user interfaces to the corresponding local area networks each of which accommodates a plurality of user terminals. In FIG. 1, user interfaces 21, 31 and 41 and local area network 22, 32 and 42 respectively show one of the plurality of user interfaces and local area networks.

Centralized ATM exchanges 50 and 60 are connected to connectionless service (CLSF) processors 51 and 61, respectively. A semi-fixed virtual connection 71 is provided between user interface 21 and connectionless service processor 51 through distributed ATM exchange 20 and centralized ATM exchange 50. A semi-fixed virtual connection 72 is provided between connectionless service processors 51 and 61 through centralized ATM exchanges 50 and 60. A semi-fixed virtual connection 73 is provided between connectionless service processor 61 and user interface 31 through centralized ATM exchange 60 and distributed ATM exchange 30. A semi-fixed virtual connection 74 is provided between user interface 41 and connectionless service processor 51 through distributed ATM exchange 40 and centralized ATM exchange 50.

In this embodiment, communication is carried out among user terminals 23, 33 and 43 by using semi-fixed virtual connections 71, 72, 73 and 74 provided respectively between user interface 21 and connectionless service processor 51, between connectionless service processor 51 and 61, between connectionless service processor 61 and user interface 31, and between user interface 41 and connectionless service processor 51.

User interfaces 21, 31 and 41 terminate protocols of local area networks 22, 32 and 42, add required headers to the data cells from the user terminals 23, 33 and 43, perform segmenting to the resulting data cells to form ATM cells and deliver the ATM cells into a wide band-ISDN network (ATM network) 100.

Connectionless service processors 51 and 61 carry out routing to the ATM cells delivered from user interfaces 21, 31 and 41 in a connectionless manner.

An E. 164 address stipulated by CCITT, E. 164 is allocated to each of user interfaces 21, 31 and 41.

Figure 2A:
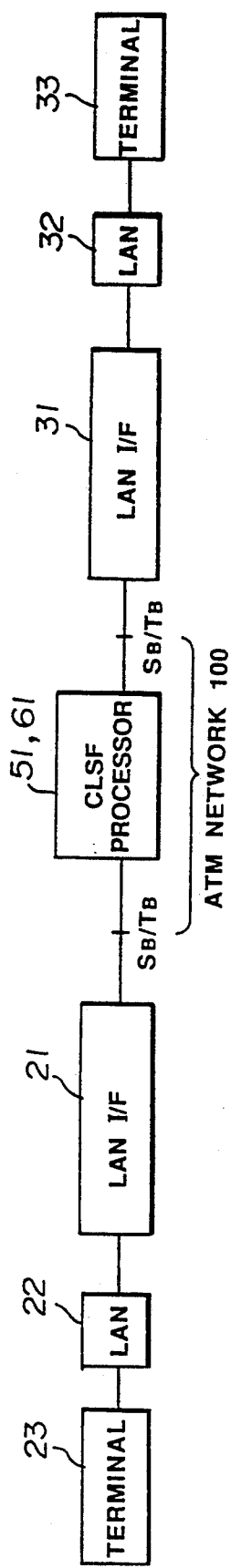
FIG. 2 shows a protocol model of the embodiment of FIG. 1.
Figure 2B:
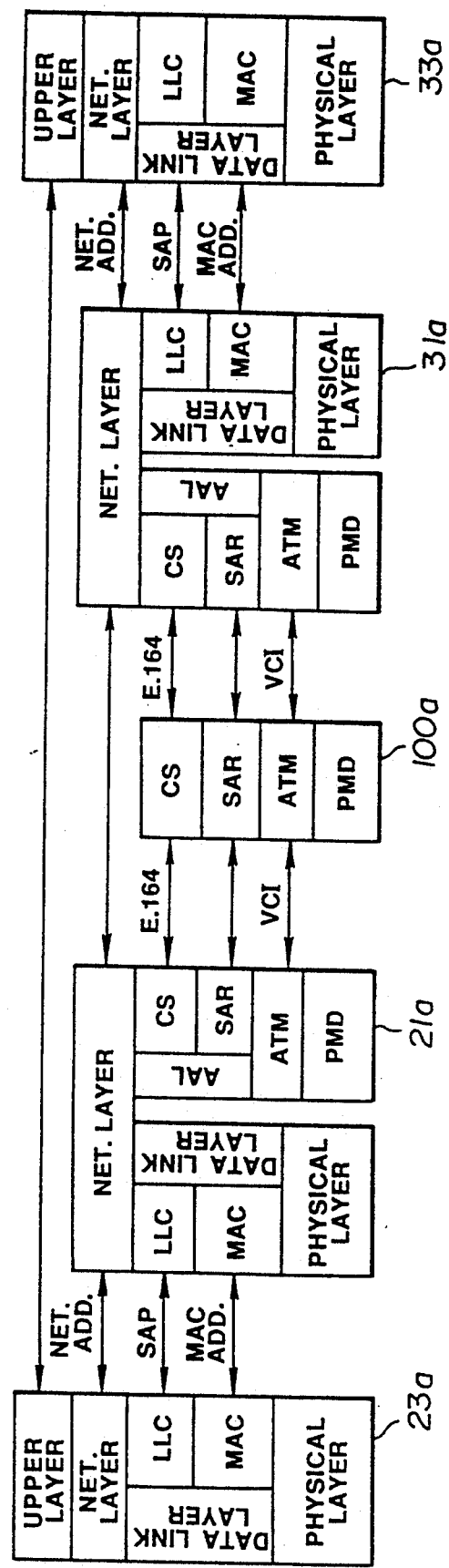

FIG. 2 shows a protocol model for communication established between user terminals 23 and 33 accommodated in local area networks 22 and 32, respectively, in the FIG. 1 arrangement. FIG. 2(a) shows the connection between user terminals 23 and 33. FIG. 2(b) shows protocol models 23a, 21a, 100a, 31a and 33a of terminal 23, user interface 21, connectionless service processors 51 and 61, user interface 31 and terminal 33, respectively.

Protocol model 23a of terminal 23 includes an upper layer, a network layer, a data link layer and a physical layer. The data link layer includes two sublayers; namely, a link layer control (LLC) layer and a media access control (MAC) layer.

Protocol model 21a of user interface 21 includes a network layer, a data link layer which includes a link layer control (LLC) layer and a media access control (MAC) layer, physical layer, an adaptation (AAL) layer which includes a convergence (CS) layer and a cell decomposition/assembly (SAR) layer, and an ATM layer and a PMD layer.

Protocol model 100a of each of connectionless service processors 51 and 61 includes a convergence (CS) layer, a cell decomposition/assembly (SAR) layer, an ATM layer and a PMD layer.

Protocol model 31a of user interface 31 includes a network layer, an adaptation (AAL) layer which includes a convergence (CS) layer and a cell decomposition/assembly (SAR) layer, an ATM layer, a PMD layer, a data link layer which includes a link layer control (LLC) layer and a media access control (MAC) layer, and a physical layer.

Protocol model 33a of terminal 33 includes an upper layer, a network layer, a data link layer which includes a link layer control (LLC) layer and a media access control (MAC) layer, and a physical layer.

User interfaces 21, 31 each have the function of a router, so that local area networks 22, 32 and ATM network 100 are relayed by the corresponding network layers. As will be described in more detail later, connectionless service processors 51, 61 each refer to an E. 164 address added to the header for routing purposes, so that protocol model 100a of each of connectionless service processors 51, 61 covers up to a CS layer.

Connectionless service processors 51, 61 are connectionless, so that they do not provide error control and flow control.

Therefore, error control and flow control are performed by user terminals 23 and 33 on an end-to-end basis as in an ordinary local area network.

Figure 3:
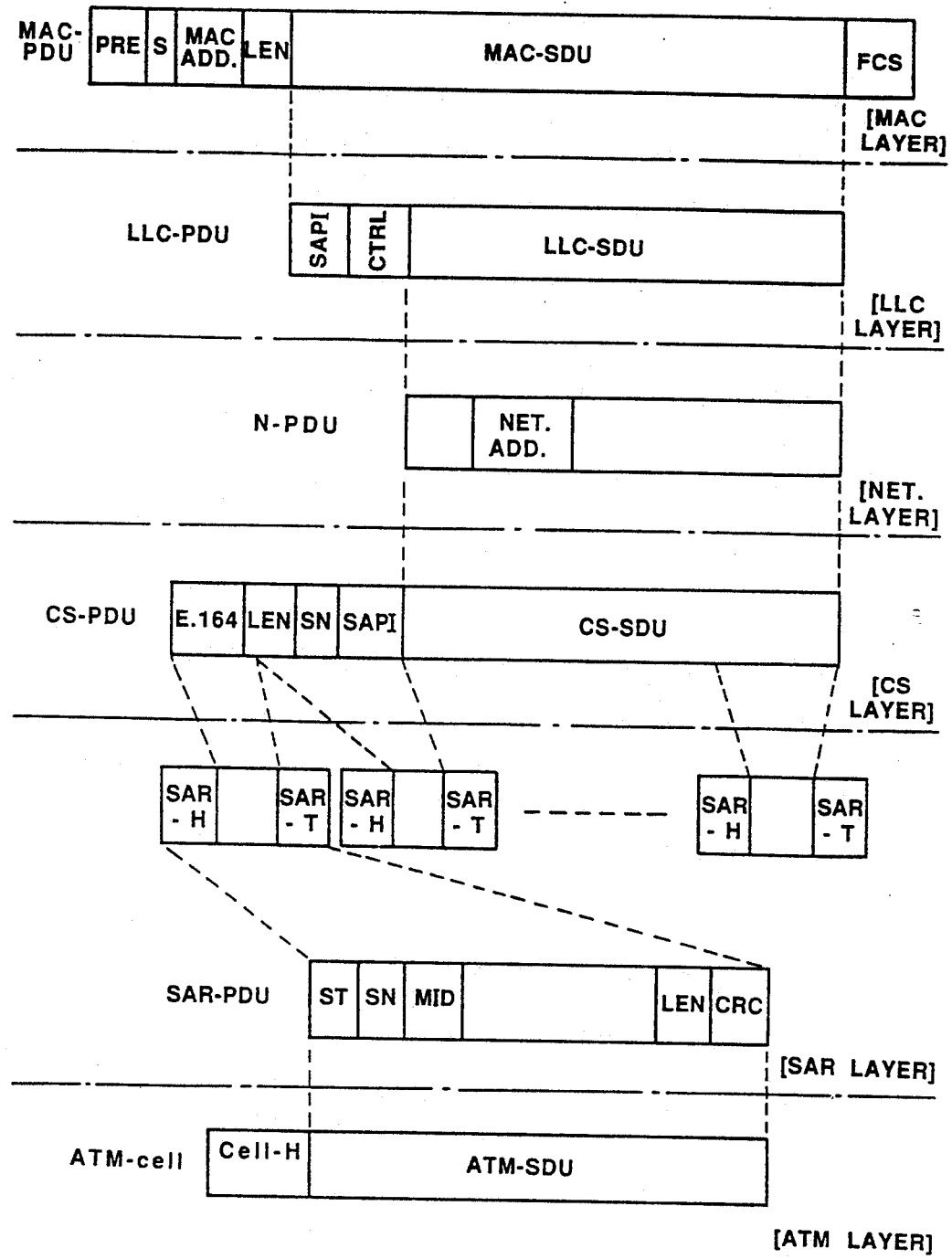
FIG. 3 shows a signal format illustrating the structure of a protocol data unit in each layer of a user interface of the embodiment in FIG. 1.

FIG. 3 shows the structure of a protocol data unit (PDU) in each of the layers of user interfaces 21 and 31 of this embodiment. MAC protocol data unit (MAC-PDU) in the MAC layer includes a preamble field (PRE), a stop bit field (S), a MAC address field (AMC address), and a length field (LEN) in the header thereof, and a frame check sequence field (FCS) in the trailer thereof. LLC protocol data unit (LLC-PDU) in the LLC layer includes a service access point identifier field (SAPL) and a control field (CTRL) in the header thereof. Network protocol data unit (N-PDU) in the network layer includes a network address field in the header thereof. CS protocol data unit (CS-PDU) in the CS layer includes an E. 164 address field (E. 164), a length field (LEN), a sequence number field (SN), and a service access point identifier field (SAPL) in the header thereof. SAR protocol data unit (SAR-PDU) in the SAR layer includes a head field (SAR-H) and a trailer field (SAR-T). The header field (SAR-H) includes a segment type field (ST), a sequence number field (SN), and a multiplexing identifier field (MID). A trailer field (SAR-T) includes a length field (LEN) and a CRC check field (CRC). The ATM layer uses an ATM cell.

User interfaces 21, 31 check destination MAC addresses of the MAC-PDUs received from local area networks 22, 32, respectively. If those addresses are of their own, the respective MAC, LLC and network layers perform their corresponding processing operations and the network layers transfer the CS service data units (CS-SDU) to the corresponding CS layers. The CS layers each add a CS header including an E. 164 address and other data to the CS-SDU and transfers as a SAR service data unit (SAR-SDU) to the SAR layer. SAR-SDU is processed in the respective SAR and ATM layers to become an ATM cell, which is then sent out to a semi-fixed virtual connection for a nearby CLSF processor.

The details of a process in each of the layers of user interfaces 21 and 31 will be described next.

While it is assumed that the protocol of each of local area networks 22, 32 is typically an IEEE 802.2, 3, a similar process would be performed when other protocols are employed.

(a) The data link layer:

The data link layer includes two sublayers MAC and LLC.

The MAC layer

The MAC layer performs filtering to the destination MAC address of an MAC-PDU received from local area networks 22, 32. If the address is directed to the MAC layer, MAC-SDU is delivered to the LLC layer.

When the MAC layer receives MAC-SDU from the LLC layer, it adds a MAC header to MAC-SDU and delivers the resulting data as MAC-PDU to the local area network.

At this time, the MAC address is determined as follows:

1) The MAC address is drawn from an internal table on the basis of the network address; and
2) If there is no MAC address in the table, the MAC address is checked using an ARP (Address Resolution Protocol).

The ARP is a process to check the MAC address of a terminal or the like only the network address of which is known.

The check end sends an ARP request packet in which the destination network address is the appropriate terminal and the destination MAC address is a broadcast.

The terminal end checks the destination network address of the ARP request packet. If the address is of the terminal end, the terminal end transmits to the inquirer an ARP response packet in which the caller MAC address is of the terminal end.

The LLC layer:

The LLC layer transfers LLC-SDU from a service access point based on SAPI to the network layer.

b) The network layer:

It checks the E. 164 address of the destination LAN I/F by referring to the destination network address of N-PDU (LLC-SDU) received from the LLC layer, and transfers N-PDU to the CS layer.

c) The AAL layer:

The AAL layer comprises two sublayers, namely, CS and SAR layers.

The CS layer:

It adds a CS header to CS-SDU (N-PDU) and delivers the resulting data as CS-PDU to the SAR layer. It adds the E. 164 address checked in the network layer to the head of the CS header. This is because when CLSF processors 51, 61 transfer cells, the E. 164 address is required to be in a BOM cell (a cell having a head segment of CS-PDU) and a SSM cell (a cell in which CS-PDU is accommodated as a single segment).

The SAR layer:

SAR-SDU (CS-PDU) is divided into segments each having a size appropriate for accommodation in a SAR pay load, SAR-header SAR-H and SAR-trailer SAR-T are added to the respective segments and the resulting segments are delivered as SAR-PDU to the ATM layer. The format of SAR-PDU conforms to the format of AAL class 4 prescribed in I. 363.

d) The ATM layer:

A cell header is added to ATM-SDU (SAR-PDU) and the resulting cell is sent as an ATM cell onto a virtual connection set beforehand between LAN I/F and a nearby CLSF processor.

Figure 4:
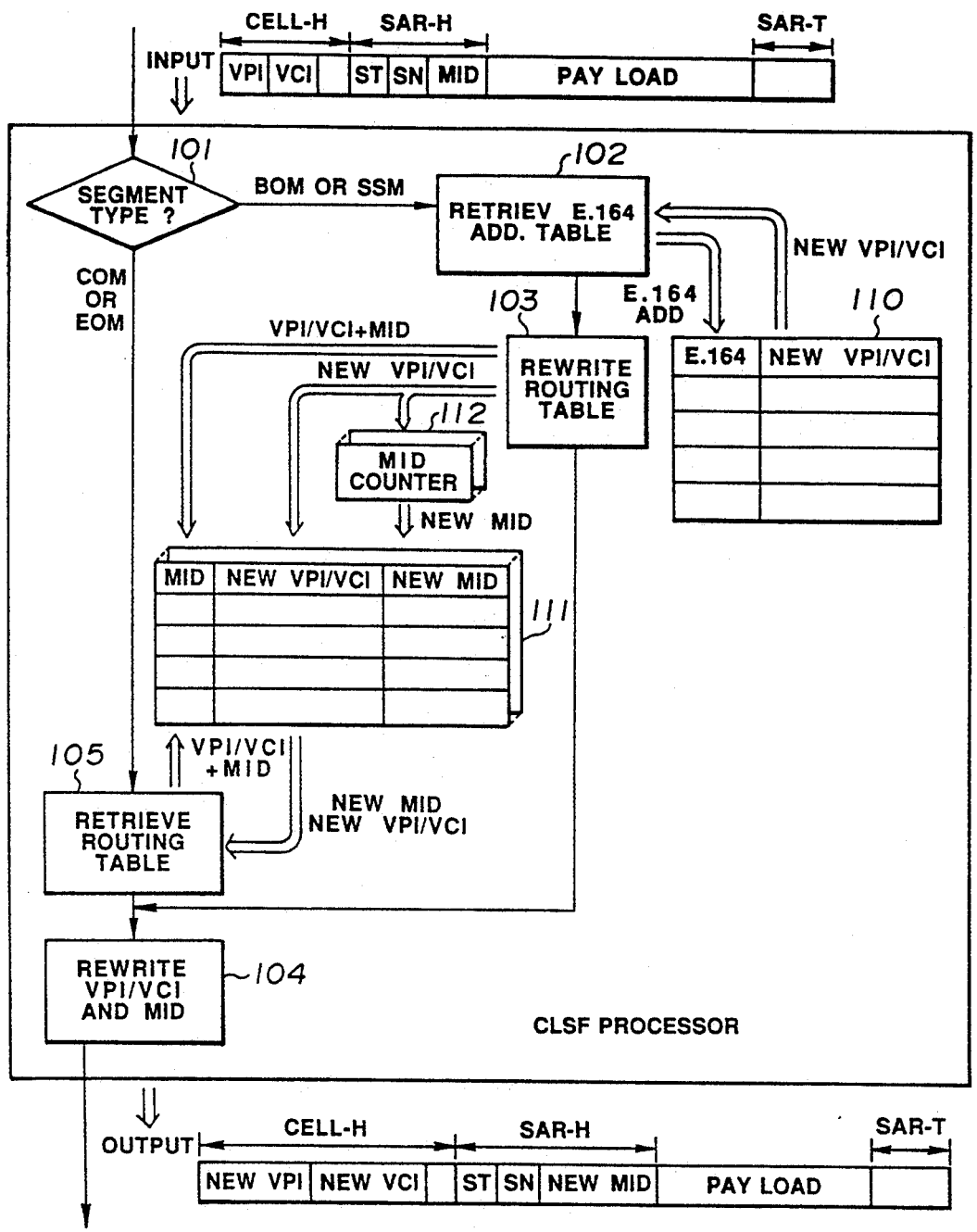
FIG. 4 is a block diagram illustrating a routing algorithm of a cell in a connectionless service processor of the embodiment in FIG. 1.

FIG. 4 shows a routing algorithm of a cell in connectionless service processors (CLSF processors) 51, 61 in the embodiment. Processors 51, 61 each receive an ATM cell, which includes a cell header Cell-H and a SAR header SAR-H, as will be seen from the structure of the ATM layer of FIG. 3. The cell header Cell-H includes a virtual identifier VPI and a virtual connection identifier VCI. SAR header SAR-H includes a segment type ST, a sequence number SN and a multiplexing identifier MID.

The connectionless service processor (CLSF processor) sets a transfer route on the basis of the E. 164 address added to the head of CS-PDU in the FIG. 3 CS layer. The route is set on the basis of the E. 164 address included in the head one of a plurality of ATM cells into which CS-PDU is segmented. This transfer route is constant during transfer of any one CS-PDU. The transfer route is determined by selecting a usable one of the virtual connections provided beforehand for service in the connectionless service processor. Each of the second and subsequent ones of the ATM cells into which CS-PDU is segmented is transferred while the output side virtual connection identifier VCI is being retrieved on the basis of the virtual connection identifier VCI and multiplexing identifier MID of the ATM cell input to the connectionless service processor (CLSF processor), and the header of the ATM cell is being converted. A table for the header conversion is set on the basis of the head cell.

In FIG. 4, the segment type of the ATM cell inputted into the connectionless service processor (CLSF processor) is determined on the basis of the segment type ST of the SAR header SAR-H (step 101). There are four segment types; namely, BOM cell, SSM cell, COM cell and EOM cell. At step 101 the cell is classified into a BOM cell or a SSM cell and a COM cell or an EOM cell.

a) When the received cell is either a BOM cell or a SSM cell:

If the received ATM cell is either a BOM cell or a SSM cell, E. 164 address table 110 is retrieved (step 102). Written on E. 164 address table 110 is a new virtual path identifier VPI and a new virtual connection identifier VCI of a semi-fixed vertical connection in the direction in which a destination user interface (LAN I/F) is provided at each E. 164 address.

E. 164 address table 110 is written on the basis of M-plane component data.

At step 102 E. 164 address table 110 is retrieved with the E. 164 address as a key to search a new virtual path identifier VPI and a new virtual connection identifier VCI of a semi-fixed virtual connection in the direction in which the destination user interface is provided.

Subsequently, routing table 111 is rewritten on the basis of the new virtual identifier VPI and the new virtual connection identifier VCI obtained from E. 164 address table 110 (step 103).

Routing table 111 is provided for each virtual connection identifier VCI. Routing table 111 is adapted to be written with new virtual path identifier VPI/new virtual connection identifier VCI and new multiplexing identifier MID for each multiplexing identifier MID.

MID counter 112 includes a 10-bit binary counter provided for each new VCI.

At step 103 MID counter 112 is selected with a new virtual connection identifier VCI and is incremented to provide a new multiplexing identifier MID. Routing table 111 is selected with the virtual path identifier VPI/virtual connection identifier VCI and multiplexing identifier MID of the received ATM cell as keys, and new virtual path identifier VPI/new virtual connection identifier VCI and new multiplexing identifier MID obtained from MID counter 112 are written at the corresponding location of routing table 111. The MID counter is incremented when the BOM cell or SSM cell obtains new virtual connection identifier VCI. The count of this counter becomes a multiplexing identifier MID in new virtual connection identifiers VCI of the BOM cell or SSM cell and the train of subsequent cells (cells of the same CS-PDU).

The data written once into routing table 111 in this way is maintained until a BOM or SSM cell having the same virtual connection identifier VCI and multiplexing identifier MID is received.

Virtual path identifier VPI and virtual connection identifier VCI of the cell header Cell-H are rewritten as new virtual identifier VPI and new virtual connection identifier VCI, respectively, and the multiplexing identifier MID of SAR header SAR-H is rewritten as a new multiplexing identifier MID (step 104) and the written cell is provided as an output ATM cell.

b) When the received ATM cell is either a COM cell or an EOM cell:

In this case, routing table 111 is retrieved with virtual path identifier VPI/virtual connection identifier VCI and multiplexing identifier MID of the input ATM cell as keys (step 105), and new virtual path identifier VPI/new virtual connection identifier VCI and new MID are read from routing table 111. Virtual path identifier VPI and virtual connection identifier VCI of cell header Cell-H are rewritten as new virtual path identifier VPI and new virtual connection identifier VCI, and SAR header SAR-H multiplexing identifier MID is rewritten as new multiplexing identifier MID (step 104), and the rewritten cell is provided as an output ATM cell.

Figure 5:
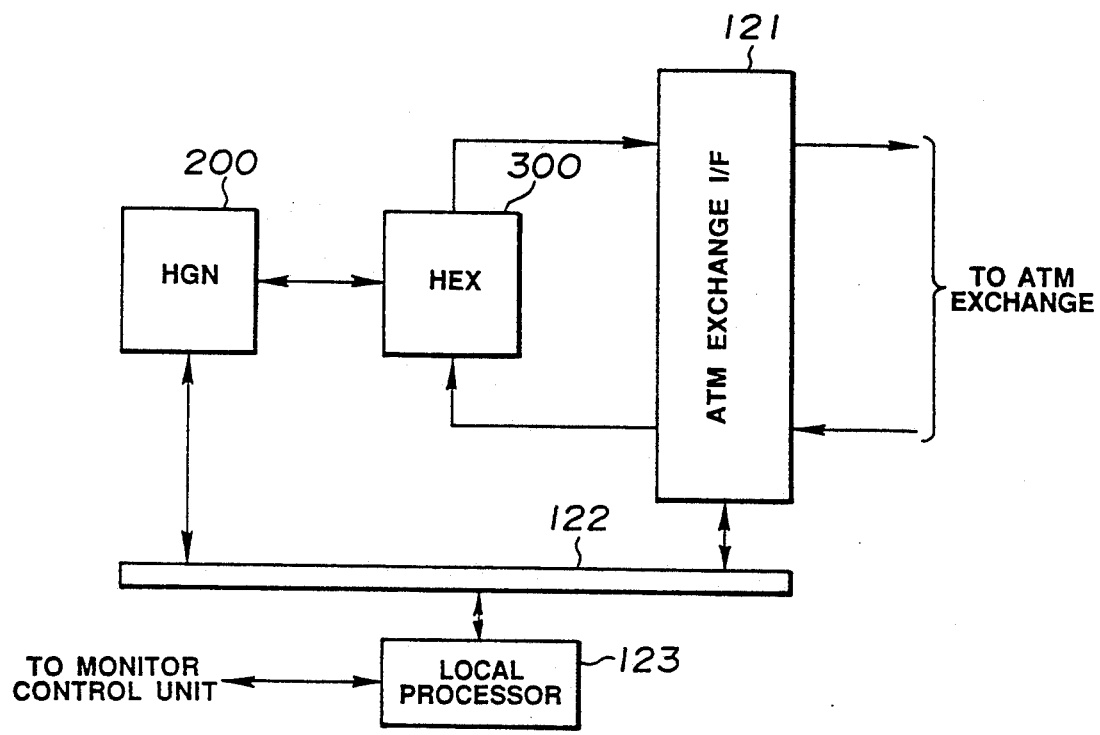
FIG. 5 is a block diagram of the entire connectionless service processor of the embodiment in FIG. 1.

FIG. 5 is a block diagram of the overall structure of the connectionless service processor (CLSF processor). CLSF processor includes header generator (HGN) 200, header exchanger (HEX) 300, ATM exchange interface 121, internal system bus 122 and local processor 123.

Header exchanger 300 buffers a received ATM cell and delivers the virtual path identifier VPI, virtual connection identifier VCI, multiplexing identifier MID, segment type ST, destination E. 164 address of the cell to header generator 200 and requests search for a new header to be used. When header generator 200 receives this request, it determines new virtual path identifier VPI, virtual connection identifier VCI, and multiplexing identifier MID from the given data and returns it to header exchanger 300. Header exchanger 300 replaces new virtual path identifier VPI/new virtual connection identifier VCI, new multiplexing identifier MID in cell header Cell-H, SAR header SAR-H regions, respectively.

Figure 6:
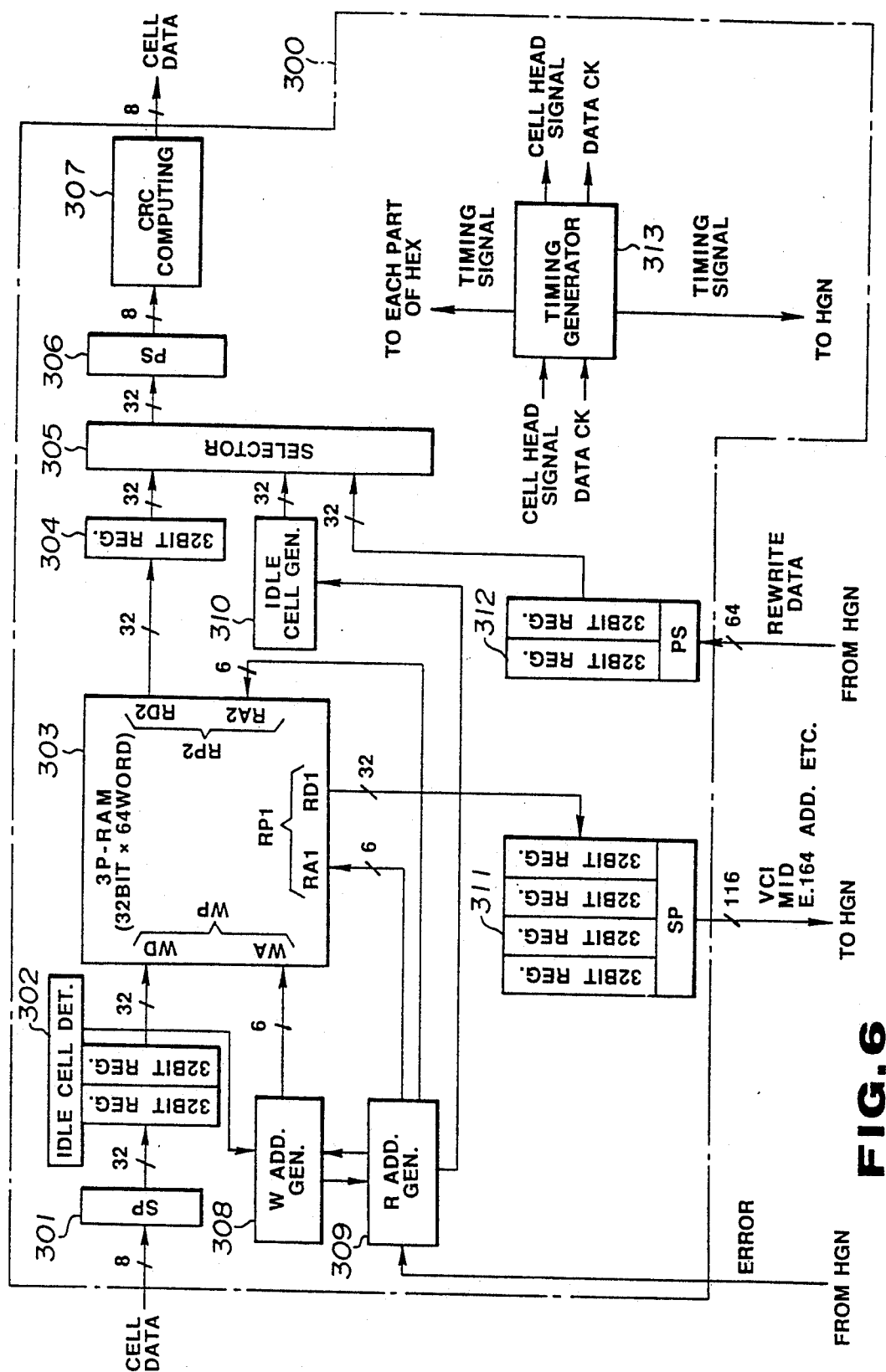
FIG. 6 is a block diagram of illustrating the detailed structure of a header exchanger of FIG. 5.

FIG. 6 shows the detailed structure of header exchanger 300 of FIG. 5. It includes serial/parallel converter (SP) 301, idle cell detectors 302, 3-port random access memory (3P-RAM) 303, 32-bit register 304, selector 305, parallel/serial converter (PS) 306, CRC computing unit 307, write address generator 308, read address generator 309, idle cell generator 310, data output register 311, data input register 312, and timing generator 313.

3-port random access memory 303 is used as a buffer storage region required for the conversion of the ATM cell header. It includes a 3-port RAM having a single write port and two read ports and has a storage capacity for 64 words of 32 bits. These read/write ports are each operable in an asynchronous manner. The storage region of memory 303 is divided into 4 blocks each having a length of one cell and a different block number.

An ATM cell received synchronously with data CK externally is converted by SP301 to a 32-bit width data. Thereafter, the data passes twice through a 32-bit width register of idle cell detector 302 to detect an idle cell and is then written through write port (WP) of 3-port random access memory 303. A block into which the data is written is selected from an idle block list which write address generator 308 has. At this time, if the received ATM cell is an idle one, writing a cell into memory 303 is inhibited. After one ATM cell is written, the number of the block into which the ATM cell is written is transferred by handshaking to read address generator 309.

Read address generator 309 which has received the number of the block into which the cell has been written first uses read port (RP) 1 of 3-port random access memory 303 to read the head 4 words of the ATM cell stored in the block having that number, and transfers them through data output register 311 to header generator 200.

Figure 7:
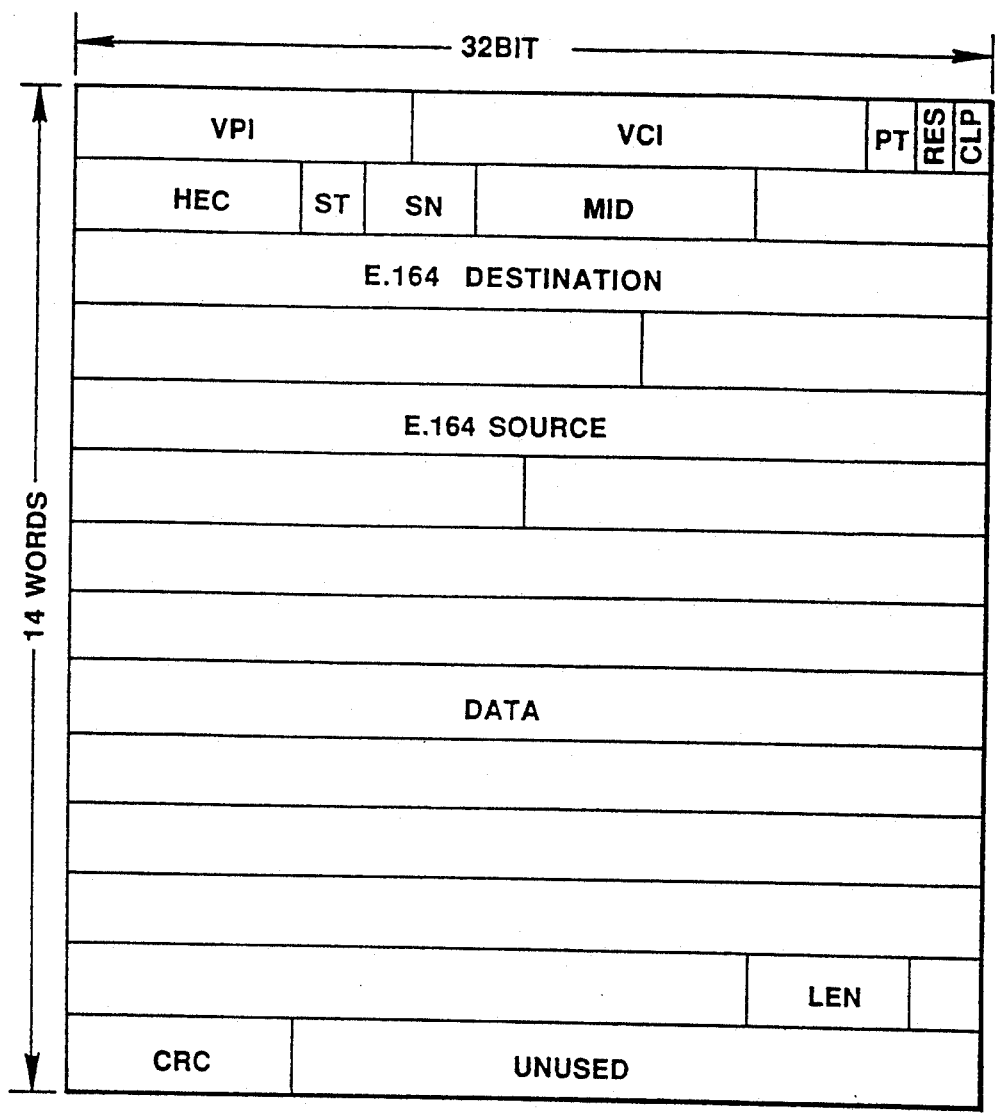
FIG. 7 shows one example of a cell format in a three-port RAM of FIG. 6.

FIG. 7 shows the format of a cell in memory 303 of this embodiment. As shown in FIG. 7, the head 4 words include virtual path identifier VPI, virtual connection identifier VCI, multiplexing identifier MID, and segment type ST.

If the received cell is either a BOM cell or a SSM cell, the destination E. 164 address is stored in the head 60 bits (15 figures) of the SAR pay load in user interface (LAN I/F), so that the received cell is also contained in the head 4 words.

Header generator 200 determines new virtual path identifier VPI, new virtual connection identifier VCI, and new multiplexing identifier MID on the basis of the received data and reports those data items to header exchanger 300 at predetermined timings.

Read address generator 309 of header exchanger 300 starts to read from real port 2 (RP2) the ATM cell stored in the block having the above-mentioned block number, and merges new virtual path identifier VPI, new virtual connection identifier VCI, and multiplexing identifier MID reported by header generator 200 with data read from RP2 using a selector to thereby replace the header.

At this time, if header generator 200 fails in the determination of new virtual path identifier VPI, new virtual connection identifier VCI, and new multiplexing identifier MID (for example, if it uses the E. 164 address not registered in header generator 200 of the CLSF processor), it reports an error. In this case, an idle cell is outputted from idle cell generator 310 in place of the cell the header of which is to be converted and the idle cell is erased. The number of the block in which the idle cell is stored is delivered as the number of the block from which the cell has been read to write address generator 308.

Thereafter, a CRC is again calculated by CRC calculating unit 307 and outputted.

Read address generator 309 delivers to write address generator 309 in a handshaking manner the number of the block which has become idle after the cell is outputted.

Reading data from port RP1 of memory 303 and reading a cell from port RP2 are performed in a pipelined manner.

Figure 8:
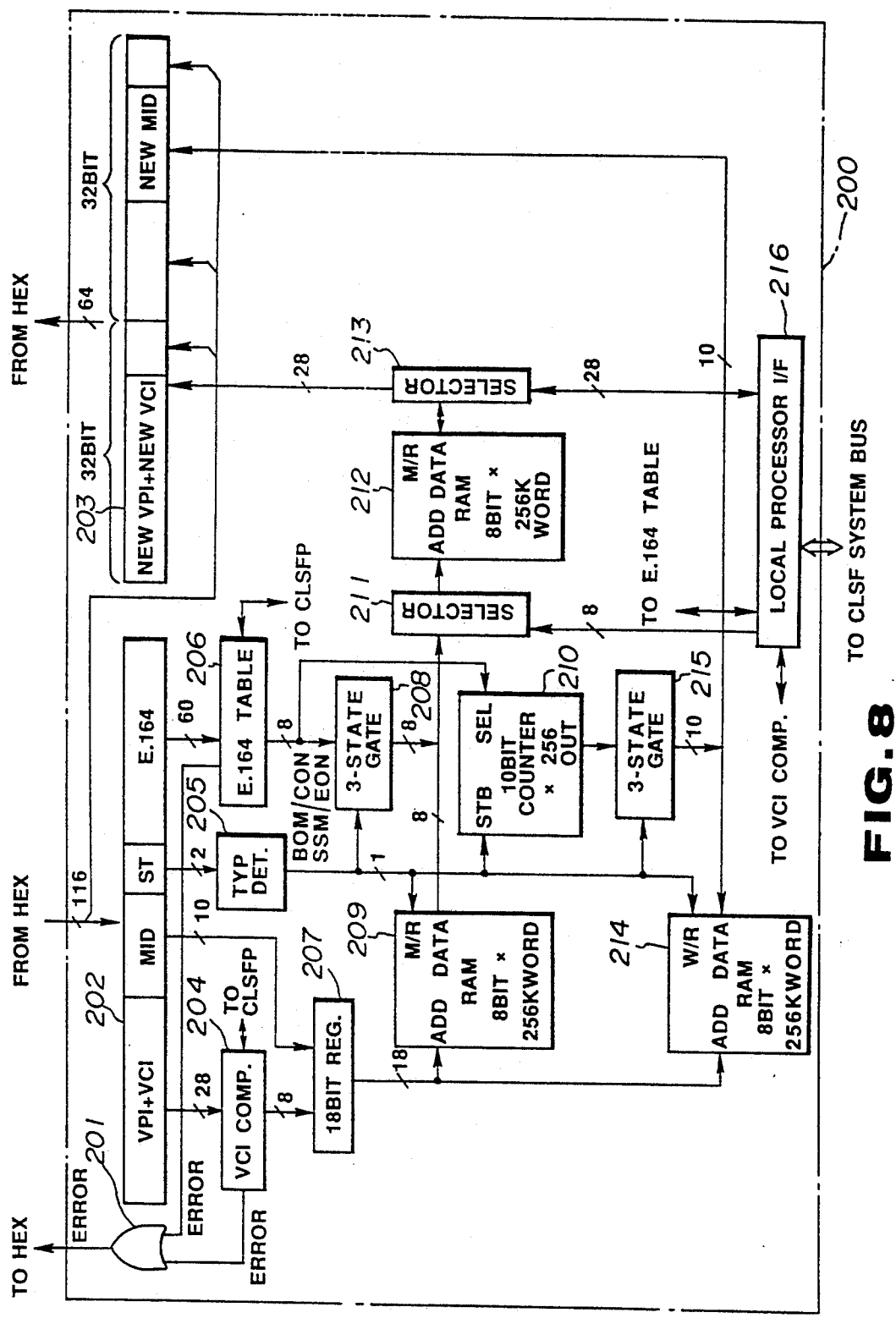
FIG. 8 is a detailed block diagram of a header generator of FIG. 5.

FIG. 8 shows the detailed structure of header generator 200, which includes a logical OR gate 201, data input register 202, data output register 203, VCI compressor 204, segment type determiner 205, E. 164 address table 206, 18-bit register 207, 3-state gate 208, routing table 209, MID counter 210, selector 211, VCI code/logical VCI conversion table 212, selector 213, MID table 214, 3-state gate 215, and local processor interface 216.

If the received ATM cell is either a BOM cell or a SSM cell, SAR pay load has the head segment of CS-PDU. Since user interface (LAN I/F) adds an E. 164 address to the head of the CS header, these cells have the E. 164 address in the head of SAR pay load.

If the received ATM cell is either a BOM cell or a SSM cell, virtual path identifier VPI, virtual connection identifier VCI, multiplexing identifier MID, segment type ST, destination E. 164 address from data output register 311 of header exchanger 300 are input to data input register 202. The destination E. 164 input to data input register 202 is used as a key to retrieve E. 164 table 206 to obtain new virtual path identifier VPI and new virtual connection identifier VCI. Since E. 164 table 206 compresses VPI and VCI to 8-bit data items and stores them as VCI codes, the VPI and VCI read from E. 164 table 206 are a new 8-bit VCI code, which will be described in more detail later.

Segment type ST input to data input register 202 at this time is either BOM or SSM, so that the output of E. 164 table 206 and MID counter 210 including a 10-bit binary counter are enabled and routing table 209 and MID table 214 are enabled to be written.

Multiplexing identifier MID in new virtual path identifier VPI is then determined and new virtual connection identifier VCI by incriminating MID counter 210 including a 10-bit binary counter provided for each new virtual connection identifier VCI code. New VCI codes representing VPI and VCI are written into routing table 209 and MID is written into MID table 214 with the VCI code and MID as keys for the subsequent COM and EOM cells.

New multiplexing identifier MID is intactly reported through data output register 206 to header exchanger 300. The new VCI code is expanded to a 28-bit new virtual path identifier VPI and a new virtual connection identifier VCI by VCI code/logical VCI conversion table 212, and the results are reported through data output register 203 to header exchanger 300.

If the received ATM cell is either a COM cell or an EOM cell, segment type ST of data input register 202 indicates COM or EOM. As a result, the output of E. 164 table 206 and MID counter 210 are disabled and routing table 209 and MID table 214 are enabled to be read by the output of segment type determiner 205.

Virtual path identifier VPI and virtual connection identifier VCI of data input register 202 are compressed to a 8-bit VCI code by VCI compressor 204 and applied to 18-bit register 207 to form the address of routing table 209 and MID table 214 together with multiplexing identifier MID of data input register 202.

New VCI code and new multiplexing identifier MID representing new virtual path identifier VPI and new virtual connection identifier VCI are read from routing table 209 and MID table 214 with the VCI code and multiplexing identifier MID outputted from 18-bit register 207 as keys. New multiplexing identifier MID is intactly reported through data output register 203 to header exchanger 300 while the new VCI code is expanded by VCI code/logical VCI conversion table 212 to new virtual path identifier VPI and new virtual connection identifier VCI each of 28 bits, which are then reported through data output register 203 to header exchanger 300.

Virtual identifier VPI and virtual connection identifier VCI (logical VCI) each of 28 bits and of data input register 202 are input to VCI compressor 204 to be compressed into a 8-bit VCI, which is then outputted. New virtual path identifier VPI and new virtual connection identifier VCI outputted from E. 164 table 206 are each a VCI code of 8 bits. As mentioned above, virtual path identifier VPI and virtual connection identifier VCI each represent a 8-bit VCI code in header generator 200 because:

1) Since a subscriber is a local area network (LAN), so that it cannot be considered that the rate of one virtual connection is 1 Mbps or less. The rate of the link is 155 Mbps, so that 256 virtual connections will suffice. Therefore, any VCI is required to be expressed with 256 (8 bits) codes; and 2) The use of 28 bits makes the hardware scale unacceptable in the state of the art.

Figure 9:
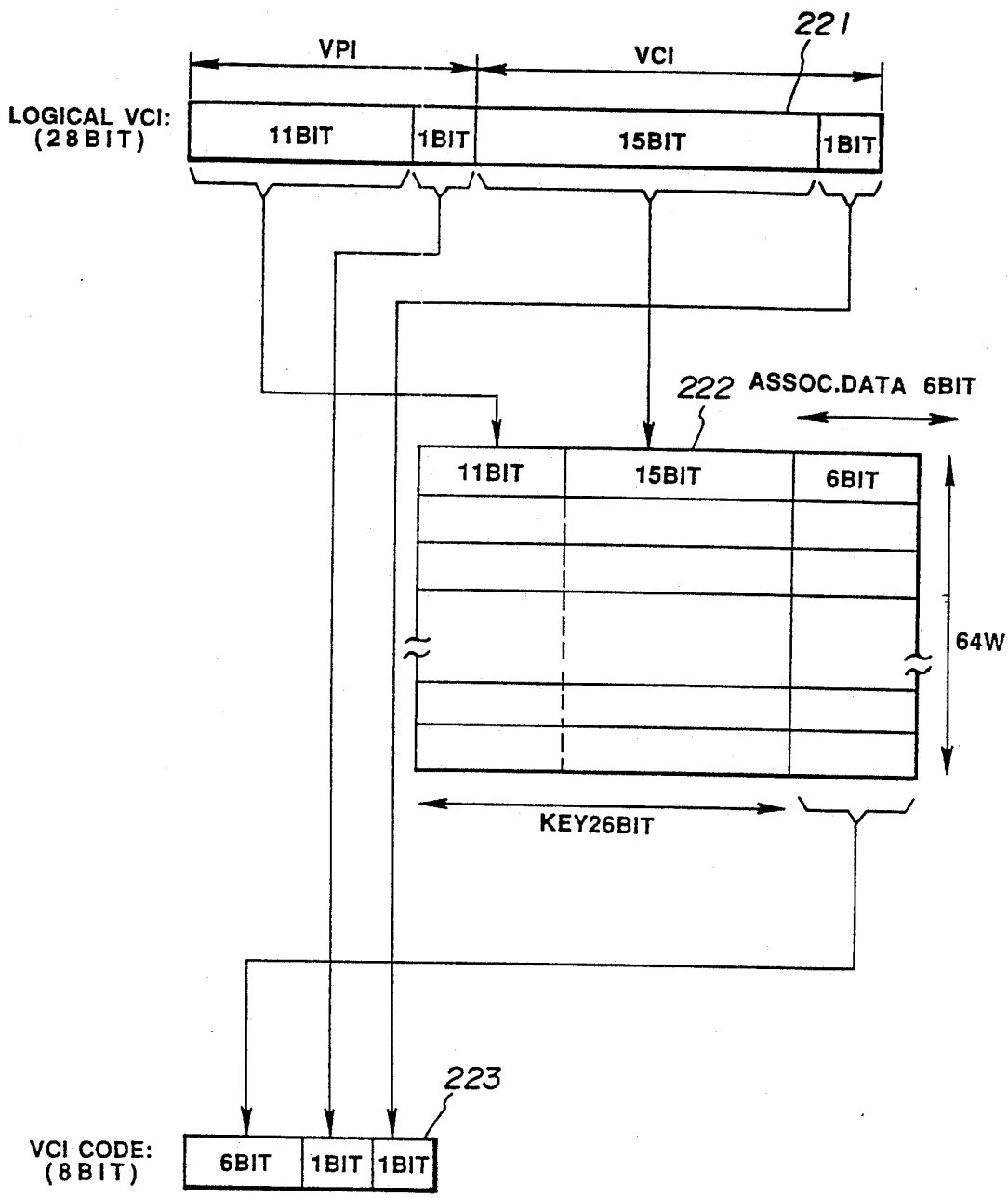
FIG. 9 shows an algorithm for compressing a 28-bit logical virtual connection identifier VCI of FIG. 8 to a 8-bit VCI code.

FIG. 9 shows an algorithm by which a virtual path identifier VPI and a virtual connection identifier VIC (logical VCI) each of 28 bits used in the present embodiment are compressed to 8-bit VCI codes. The device for execution of this algorithm includes a 28-bit logical VCI register 22 which stores logical VCIs, an associative memory 222, and an 8-bit VCI code register 223 which stores VCI codes. In the embodiment, the two least significant bits one of each virtual path identifier VPI and virtual connection identifier VCI of logical VCI are used intactly as the least 2 bits of the VCI code in order to suppress an increase in the scale of the hardware. Associative memory 222 is accessed with the remaining 26 bits of logical VCI as a key to obtain the remaining 6 bits of the VCI code.

Figure 10:
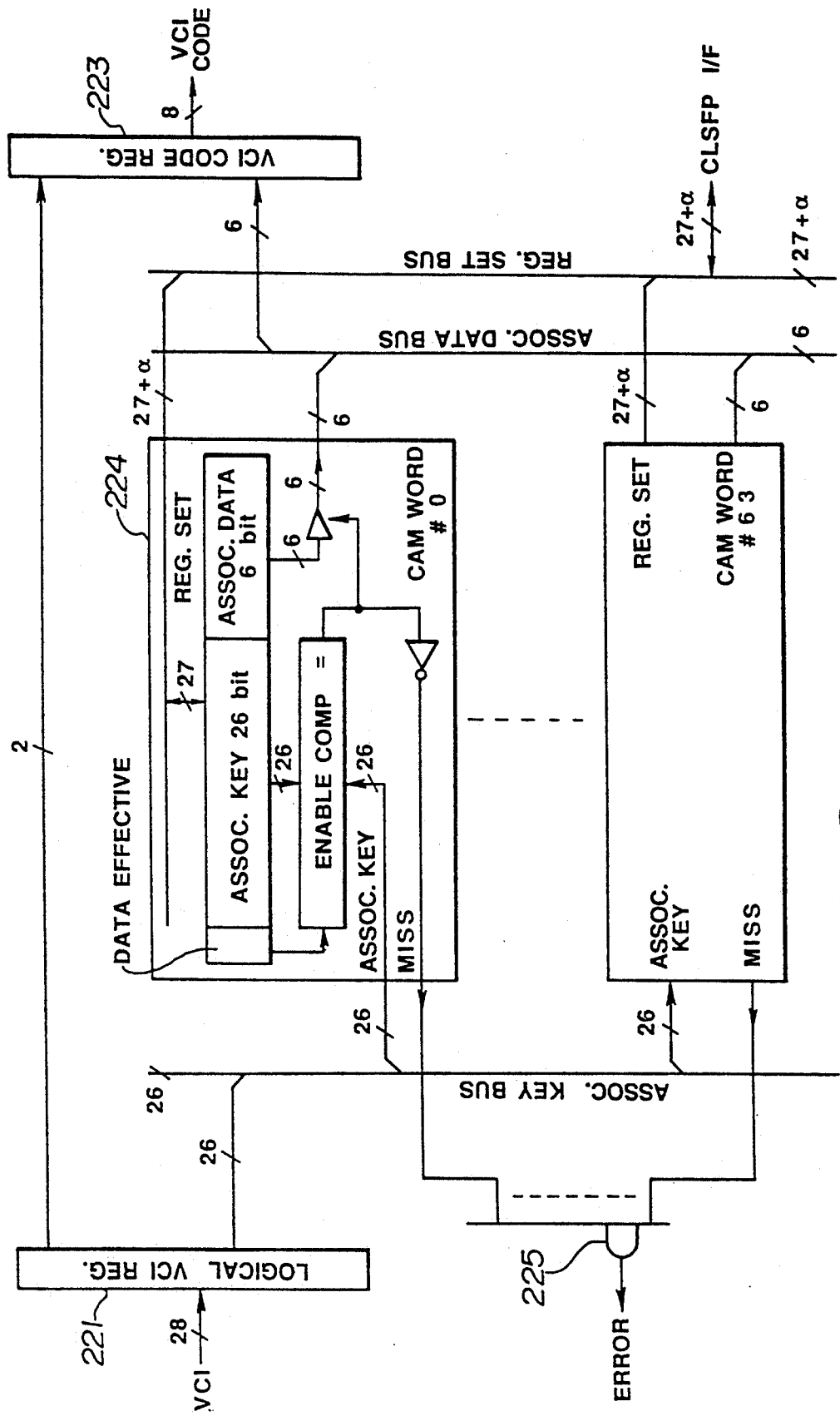
FIG. 10 is a detailed block diagram of a VCI compressor of FIG. 8.

FIG. 10 is a schematic of VCI compressor 204 of FIG. 8 and includes logical VCI register 221, VCI code register 223, CAM word 224, and logical AND gate 225.

Two bits of logical VCI stored in logical VCI register 221 and directly becoming a VCI code are delivered intactly to VCI code register 223. The remaining 26 bits are all input to 64 CAM words 224.

Each CAM word 224 compares an associative key stored therein with input data of 26 bits. If they match, it outputs associative data. The associative data of 6 bits is delivered to VCI code register 223 to become a VCI code together with the previous 2 bits. If the associative key and the input 26 bits do not match in any of CAM words 224, AND gate 225 outputs an error signal.

Figure 11:
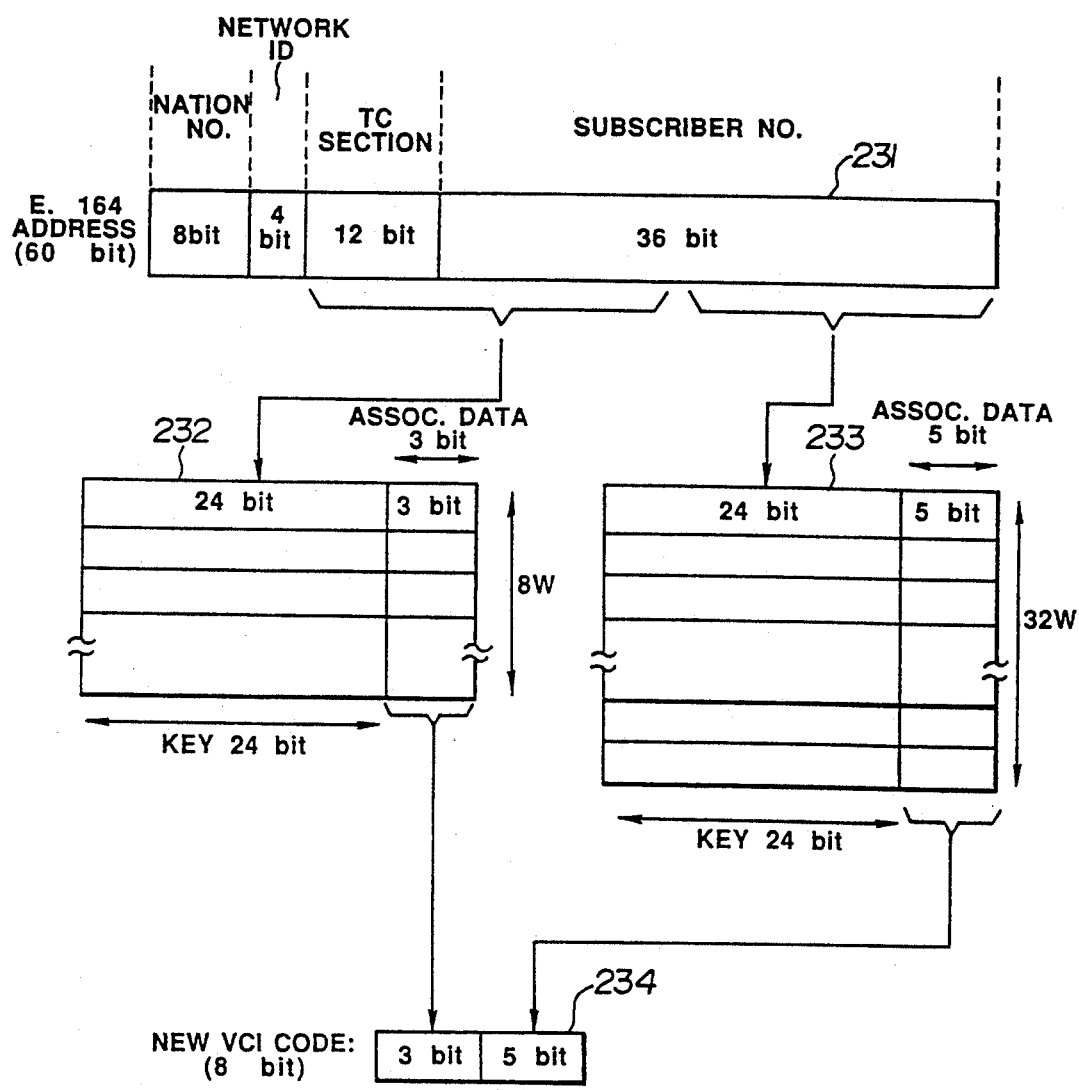
FIG. 11 shows an E. 164 address/new VCI code conversion algorithm in an E. 164 table of FIG. 8.

FIG. 11 shows an E. 164 address/new VCI code conversion algorithm in E. 164 table 206 of FIG. 8. The device for performing the algorithm includes E. 164 address register 231 which stores E. 164 addresses, associative memories 232, 233 and VCI code register which stores a new VCI code.

Basically, associative memories 232, 233 are used to obtain a new VCI code from the E. 164 address as in VCI compressor 204. However, since the E. 164 address is of 60 bits, hierarchy is formed to suppress an increase in the hardware scale.

The first 8 bits of 60 bits (15 figures) of the E. 164 address are fixed as a nation number, and the next 4 bits as a network identifier. The subsequent 48 bits indicative of the TC unit and subscriber number are divided into two hierarchies of 24 bits where the more significant 24 bits correspond to the most significant 3 bits of the new VCI code while the less significant 24 bits correspond to the least significant 5 bits of the new VCI code. Thus, the new VCI code is obtained from the E. 164 address.

Figure 12:
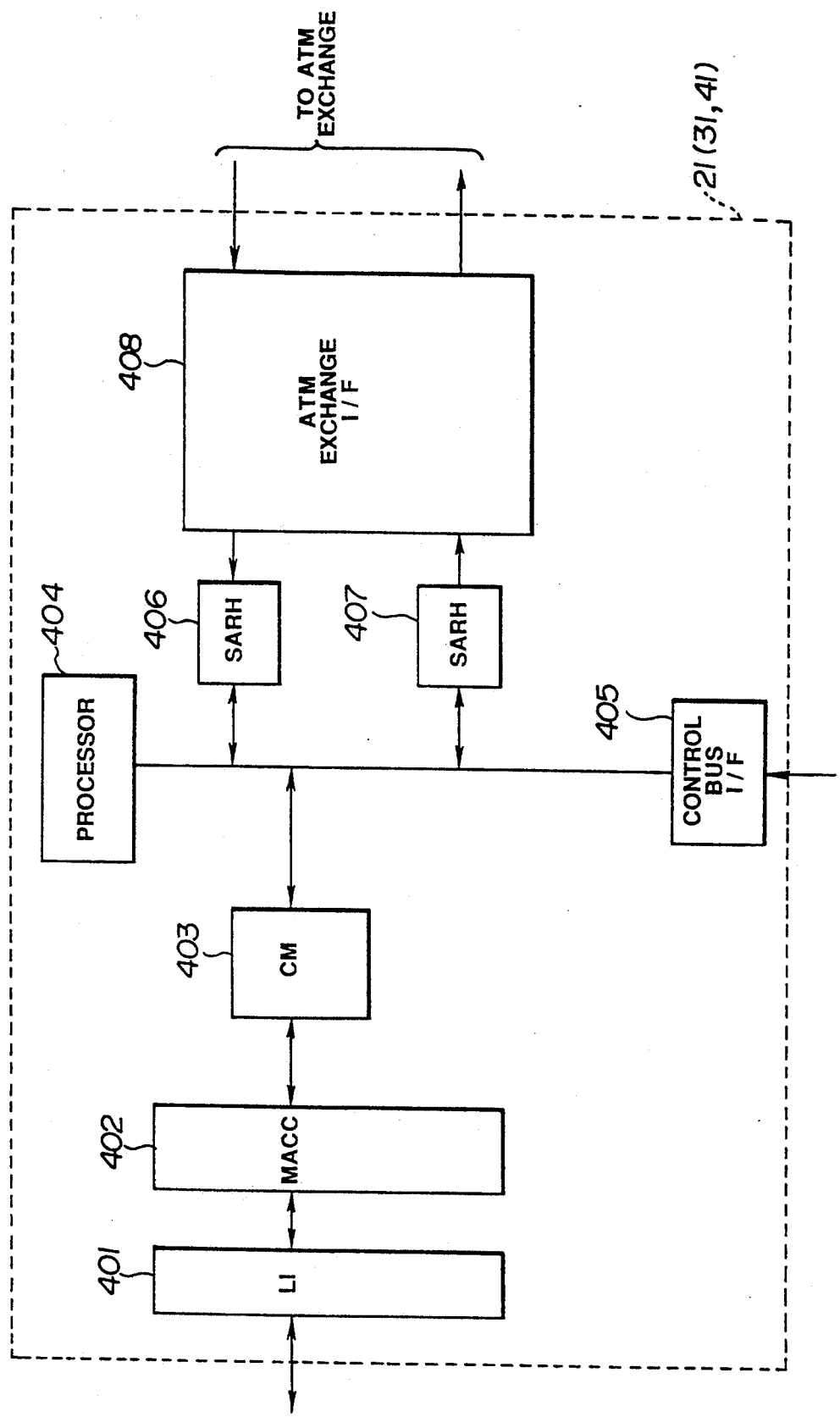
FIG. 12 is a detailed block diagram of the user interface of FIG. 2.

FIG. 12 is a block diagram illustrating the structure of user interfaces 21, 31 and 41 of the embodiment. It includes layer 1 processor (L1) 401, MAC control unit (MACC) 402, communication memory (CN) 403, processor 404, control bus interface 405, SAR layer handlers (SARH) 406, 407, and ATM exchange interface 408.

Layer 1 processor 401 terminates layer 1. MAC control unit 402 stores MAC-PDU in communication memory 403 and interrupts processor 404, which filters the MAC address. If the address is of processor 404, it terminates up to the LLC layer and forms a CS-PDU from the N-PDU. At this time, processor 404 analyzes the network address in the network header, checks the destination LAN I/F and the E. 164 address thereof and adds them to the head of the CS header. Processor 404 reports the address stored in the CM of CS-PDU to SAR layer handler 406. Handler 406 converts CS-PDU into a cell. The resulting cells are outputted through ATM exchange interface 408 to the ATM exchange.

The cells received through the switch bus are input to SAR layer handler 407 through ATM exchange interface 408. SAR layer handler 407 reassembles the cells to assemble a CS-PDU in communication memory 403. Handler 407 then interrupts processor 404, which then forms MAC-PDU from CS-PDU. At this time, destination MAC address is checked from the destination network address in the network header by means of the internal table or ARP of processor 404. Processor 404 reports the address stored in the CM of the MAC-PDU to MAC control unit 402, which then delivers a packet to the LAN through layer 1 processor 401.

What is claimed is:

1. A communication control system using an asynchronous transfer mode (ATM) network including a plurality of centralized ATM exchanges and a plurality of distributed ATM exchanges connected to the centralized ATM exchanges through an ATM transmission path, comprising:

a plurality of connectionless service processing means, each connected to one of said centralized ATM exchanges;

a plurality of user interfaces, each connected to one of said distributed ATM exchanges; and a plurality of user devices, each connected to one of said user interfaces, for carrying out connectionless communication through the ATM network, wherein the user interfaces are connected to the connectionless service processing means by virtual connections and the connectionless service processing means are interconnected by virtual connections, one of the user interfaces converts a data packet output from one of the user devices into an ATM cell and transmits the ATM cell through the virtual connections to one of the connectionless service processing means, and the one of the connectionless service processing means transfers the ATM cell to one of the virtual connections located in a direction in which a destination user interface is provided to thereby carry out routing of the ATM cell in the ATM network.

2. A communication control system according to claim 1, wherein the one of the user interfaces stores an address of the destination user interface in the ATM cell when converting the data packet output from the one of the user devices into the ATM cell, and wherein the one of the connectionless service processing means, by referring to an address of the destination user interface stored in the ATM cell, transfers the ATM cell to one of the virtual connections located in the direction in which the destination user interface is provided to thereby carry out the routing of the ATM cell.

3. A communication control system according to claim 1, wherein the one of the user interfaces carries out segmentation of the data packet output from the one of the user devices into cells of a predetermined length to form a series of ATM cells, stores an address of the destination user interface into a head one of the series of ATM cells and sends the head one of the ATM cells through the virtual connections to the one of the connectionless service processing means, and wherein the one of the connectionless service processing means, when receiving the head one of the ATM cells, selects by referring to the address of the destination user interface stored in the head one of the ATM cells, one of the virtual connections leading to the destination user interface to transfer the head one of the ATM cells to the selected virtual connection to thereby carry out the routing and, when receiving one ATM cell other than the head one of the ATM cells, transfers the one ATM cell to the selected virtual connection to thereby carry out the routing.

4. A communication control system according to claim 1, wherein the one of the user interfaces, after adding a destination address having a data length accommodatable in an SAR pay load to a head portion of a CS-PDU in a CS sublayer of an ATM adaptation layer, carries out segmentation of the data packet output from the one of the user devices to convert into a BOM cell, an SSM cell, a COM cell and an EOM cell of four segment types of ATM cells and sends them to the one of the connectionless service processing means, and wherein the one of the connectionless service processing means, by referring to an SAR header of the ATM cell being sent, if a segment type of the ATM cell being sent is BOM or SSM, selects one of the virtual connections connected to the destination user interface or one of the virtual connections connected to the connectionless service processing means located in the direction in which the destination user interface is provided on the basis of the destination address stored in the SAR pay load, converts a multiplexing identifier MID in the SAR header of the ATM cell into a new multiplexing identifier MID which is unique in the selected virtual connection and sends the ATM cell to the selected virtual connection and also stores the selected virtual connection and the new multiplexing identifier MID based on, as key information, the virtual connection through which the ATM cell has been sent and the multiplexing identifier MID of the sent ATM cell and, if the segment type of the ATM cell being sent is COM or EOM, acquires the selected virtual connection and the new multiplexing identifier MID being stored based on, as key information, the virtual connection through which the ATM cell has been sent and the MID of the sent ATM call, converts the multiplexing identifier MID in the SAR header of the ATM cell into the new multiplexing identifier MID and sends the ATM cell to the selected virtual connection.

5. A communication control system according to claim 4, wherein the connectionless service processing means comprises:

an E.164 address table for storing, for each E.164 address, a new virtual path identifier VPI and a new virtual connection identifier VCI of a semi-fixed virtual connection located in the direction in which the destination user interface is provided;

a routing table provided for each new virtual connection identifier VCI for storing the new virtual path identifier VPI, the new virtual connection identifier VCI and the new multiplexing identifier MID in association with each multiplexing identifier MID;

a plurality of MID counters provided for each new virtual connection identifier VCI;

means for retrieving the E.164 address table with the E.164 address as a key to obtain the new virtual path identifier VPI and the new virtual connection identifier VCI of the semi-fixed virtual connection located in the direction in which the destination user interface is provided, and rewriting the new virtual connection identifier VCI and the new multiplexing identifier MID in the routing table by the obtained new virtual path identifier VPI and the obtained new virtual connection identifier VCI;

means for selecting the MID counter in correspondence with the new virtual connection identifier VCI, acquiring a new multiplexing identifier MID by incrementing the MID counter and rewriting the new multiplexing identifier MID in the routing table by the acquired new multiplexing identifier MID; and means for rewriting the virtual path identifier VPI, the virtual connection identifier VCI and the multiplexing identifier MID of the input ATM cell by the new virtual path identifier VPI, the new virtual connection identifier VCI and the new multiplexing identifier MID stored in the routing table and outputting the rewritten identifiers.

* * * * *